United States Patent [19]

Weber et al.

[11] Patent Number: 5,639,833

[45] Date of Patent: Jun. 17, 1997

[54] MOLDING MATERIALS COMPRISING POLYARYLENE ETHERS AND COPOLYAMIDES

[75] Inventors: Martin Weber, Neustadt; Herbert Fisch, Wachenheim; Gunter Pipper, Bad Dürkheim; Axel Gottschalk, Neustadt, all of Germany

[73] Assignee: BASF Aktiengesellschaft, Ludwigshafen, Germany

[21] Appl. No.: 513,631

[22] Filed: Aug. 10, 1995

[30] Foreign Application Priority Data

Aug. 17, 1994 [DE] Germany ............ 44 29 107.8

[51] Int. Cl.⁶ .................................................. C08L 77/00
[52] U.S. Cl. ................... 525/420; 524/538; 525/66; 525/92 A; 525/133; 525/393; 525/394; 525/397; 525/425; 525/431; 525/432; 525/436
[58] Field of Search ................. 525/420, 397, 525/425, 431, 432, 436, 393, 394, 66, 133, 92 A; 528/339; 524/538

[56] References Cited

U.S. PATENT DOCUMENTS

| | | | |
|---|---|---|---|
| 3,729,527 | 4/1973 | Nield | 525/420 |
| 4,921,889 | 5/1990 | Lausberg et al. | 523/400 |
| 5,321,119 | 6/1994 | Torre et al. | 528/338 |

FOREIGN PATENT DOCUMENTS

| | | |
|---|---|---|
| 2050512 | 3/1992 | Canada. |
| 477757 | 4/1992 | European Pat. Off.. |
| 510383 | 10/1992 | European Pat. Off.. |
| 522307 | 1/1993 | European Pat. Off.. |
| 2122735 | 5/1991 | Germany. |
| 4121705 | 1/1993 | Germany. |

*Primary Examiner*—Ana Woodward
*Attorney, Agent, or Firm*—Keil & Weinkauf

[57] ABSTRACT

The invention is directed to molding materials containing
A) from 1 to 99% by weight of polyarylene ethers having repeating units I

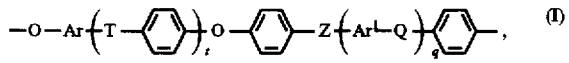

where t and q may each be an integer 0, 1, 2 or 3, T, Q and Z may each be a chemical bond or —O—, —S—, —SO$_2$—, S=O, C=O, —N=N—, R$^a$C=CR$^b$— or —CR$^c$R$^d$—, with the proviso that at least one of the groups T, Q and Z is —SO$_2$— or C=O, R$^a$ and R$^b$, R$^c$ and R$^d$, and Ar and Ar$^1$ are as defined in the specification, B) from 1 to 99% by weight of copolyamides containing b$_1$) from 30 to 44 mol % of units which are derived from terephthalic acid, b$_2$) from 6 to 20 mol % of units which are derived from isophthalic acid, b$_3$) from 43 to 49.5 mol % of units which are derived from hexamethylenediamine, b$_4$) from 0.5 to 7 mol % of units which are derived from aliphatic cyclic diamines of 6 to 30 carbon atoms and b$_5$) from 0 to 4 mol % of further polyamide-forming monomers which differ from b$_1$) to b$_4$), along with other optional additives.

9 Claims, No Drawings

MOLDING MATERIALS COMPRISING POLYARYLENE ETHERS AND COPOLYAMIDES

The present invention relates to molding materials which contain

A) from 1 to 99% by weight of polyarylene ethers having repeating units I

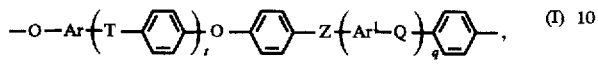

where t and q may each be an integer 0, 1, 2 or 3,

T, Q and Z may each be a chemical bond or —O—, —S—, —SO$_2$—, S=O, C=O, —N=N—, R$^a$C=CR$^b$— or —CR$^c$R$^d$—, with the proviso that at least one of the groups T, Q and Z is —SO$_2$— or C=O, R$^a$ and R$^b$ are each hydrogen or C$_1$-C$_{10}$-alkyl, R$^c$ and R$^d$ are each hydrogen, C$_1$-C$_{10}$-alkyl, C$_5$-C$_{10}$-cycloalkyl, C$_1$-C$_{10}$-alkoxy or C$_6$-C$_{18}$-aryl, where the abovementioned groups may each be substituted by fluorine and/or chlorine, Ar and Ar$^1$ are each C$_6$-C$_{18}$-aryl, which may have substituents selected from the group consisting of C$_1$-C$_{10}$-alkyl, C$_6$-C$_{18}$-aryl, C$_1$-C$_{10}$-alkoxy and halogen, B) from 1 to 99% by weight of copolyamides essentially composed of b$_1$) from 30 to 44 mol % of units which are derived from terephthalic acid, b$_2$) from 6 to 20 mol % of units which are derived from isophthalic acid, b$_3$) from 43 to 49.5 mol % of units which are derived from hexamethylenediamine, b$_4$) from 0.5 to 7 mol % of units which are derived from aliphatic cyclic diamines of 6 to 30 carbon atoms and b$_5$) from 0 to 4 mol % of further polyamide-forming monomers which differ from b$_1$) to b$_4$), the molar percentages of components b$_1$) to b$_5$) together giving 100%, and C) from 0 to 60% by weight of fibrous or particulate fillers or reinforcing agents, D) from 0 to 40% by weight of rubber impact modifiers and E) from 0 to 40% by weight of additives, processing assistants or a mixture thereof, the percentages by weight of components A) to E) together giving 100%.

The present invention furthermore relates to the use thereof.

DE-A-21 22 735 mentions generally that polysulfones can be mixed with polyamides which contain aromatic and/or aliphatic groups. Blends of polyarylene ethers and selected partly aromatic polyamides are disclosed, for example, in EP-A2-477 757 or DE-A1-41 21 705. Although the latter have heat distortion resistances and rigidities which are higher than those of blends of polyarylene ethers and aliphatic polyamides, their processing stabilities are inadequate for many applications.

It is an object of the present invention to provide blends which are based on polyarylene ethers and partly aromatic polyamides and which have good processing stabilities in addition to high rigidities and heat distortion resistances.

We have found that this object is achieved by the molding materials defined at the outset.

Component A

The amount of component A in the novel molding materials is from 1 to 99, in general 5 or more, preferably from 10 to 90, % by weight.

The polyarylene ethers A contain the repeating units I

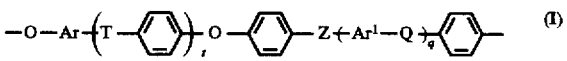

In the formula, t and q may each be 0, 1, 2 or 3. T, Q and Z independently of one another may be identical or different. They may be a chemical bond or a group selected from —O—, —SO$_2$—, —S—, C=O, —N=N— and S=O. T, Q and Z may furthermore be a group of the general formula —R$^a$C=CR$^b$— or —CR$^c$R$^d$—, where R$^a$ and R$^b$ are each hydrogen or C$_1$-C$_{10}$-alkyl and R$^c$ and R$^d$ are each hydrogen, C$_1$-C$_{10}$-alkyl, such as methyl, ethyl, n-propyl, isopropyl, tert-butyl or n-hexyl, C$_1$-C$_{10}$-alkoxy, such as methoxy, ethoxy, n-propoxy, isopropoxy or n-butoxy, or C$_6$-C$_{18}$-aryl, such as phenyl or naphthyl. R$^c$ and R$^d$ together with the carbon atom to which they are bonded may furthermore form a cycloaliphatic ring, preferably a C$_5$-C$_7$-cycloalkyl ring. This cycloalkyl ring may in turn carry one or more substituents. The preferred substituents include C$_1$-C$_{10}$-alkyl, such as methyl, ethyl, propyl or isopropyl, in particular methyl. Preferred polyarylene ethers A are those in which T, Q and Z are each —O—, —SO$_2$—, C=O, a chemical bond or a group of the formula —CR$^c$R$^d$. The preferred radicals R$^c$ and R$^d$ include hydrogen and methyl. At least one of the groups T, Q and Z is —SO$_2$— or C=O. Ar and Ar$^1$ are each C$_6$-C$_{18}$-aryl, such as 1,5-naphthyl, 1,6-naphthyl, 2,7-naphthyl, 1,5-anthryl, 9,10-anthryl, 2,6-anthryl, 2,7-anthryl or biphenyl, in particular phenyl. These aryl groups are preferably unsubstituted. However, they may have substituents selected from the group consisting of C$_1$-C$_{10}$-alkyl, such as methyl, ethyl, n-propyl, isopropyl, tert-butyl and n-hexyl, C$_6$-C$_{18}$-aryl, such as phenyl or naphthyl, C$_1$-C$_{10}$-alkoxy, such as methoxy, ethoxy, n-propoxy, isopropoxy and n-butoxy, and halogen. The preferred substituents among these include methyl, phenyl, methoxy and chlorine.

Some suitable repeating units are shown below:

(I$_1$)

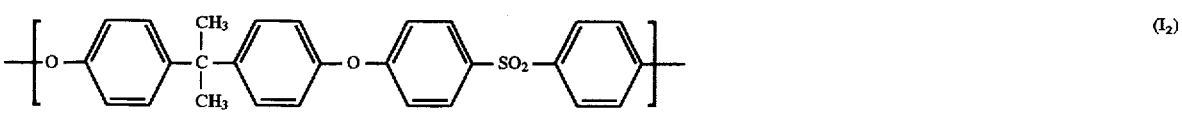

(I$_2$)

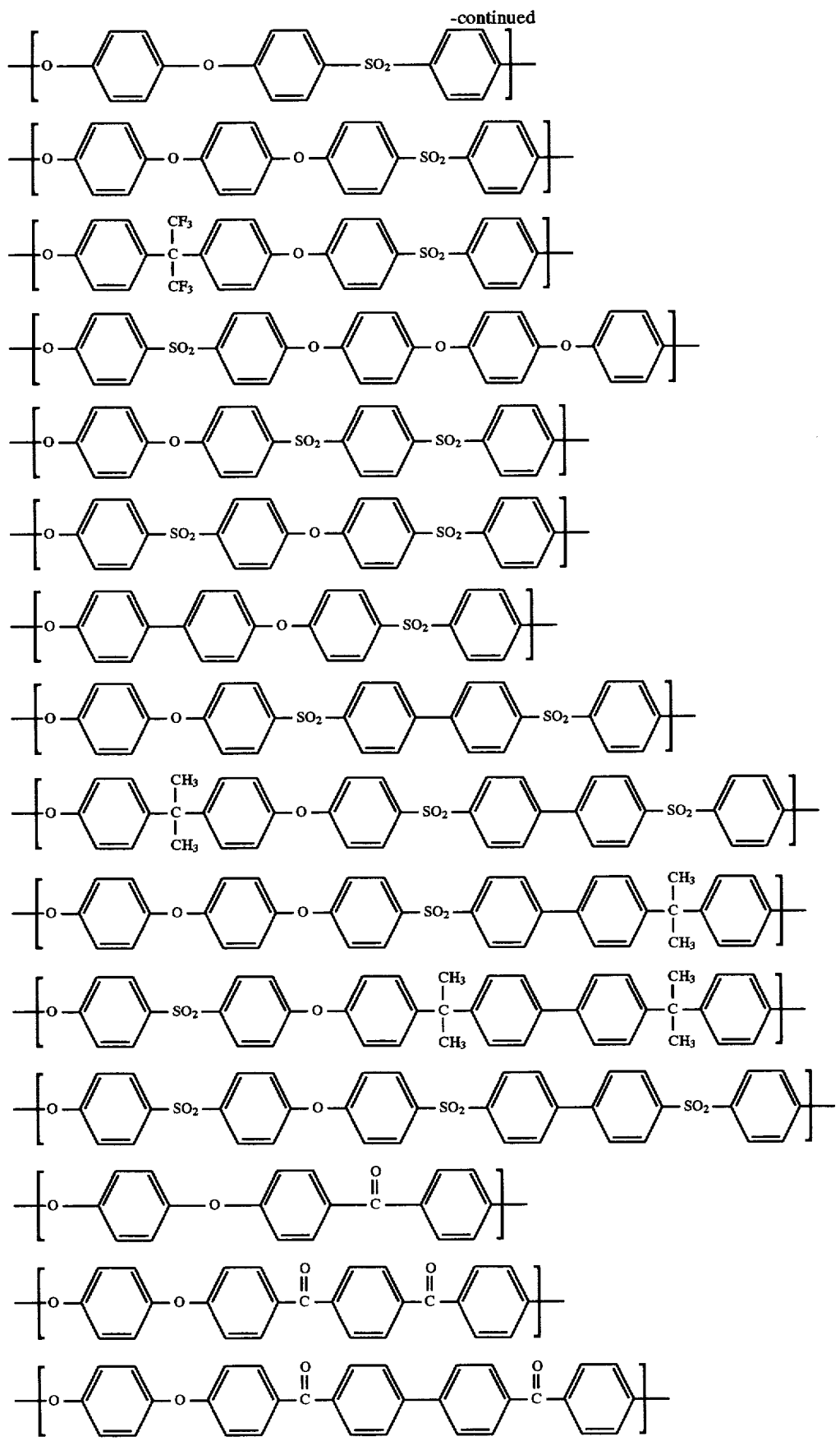

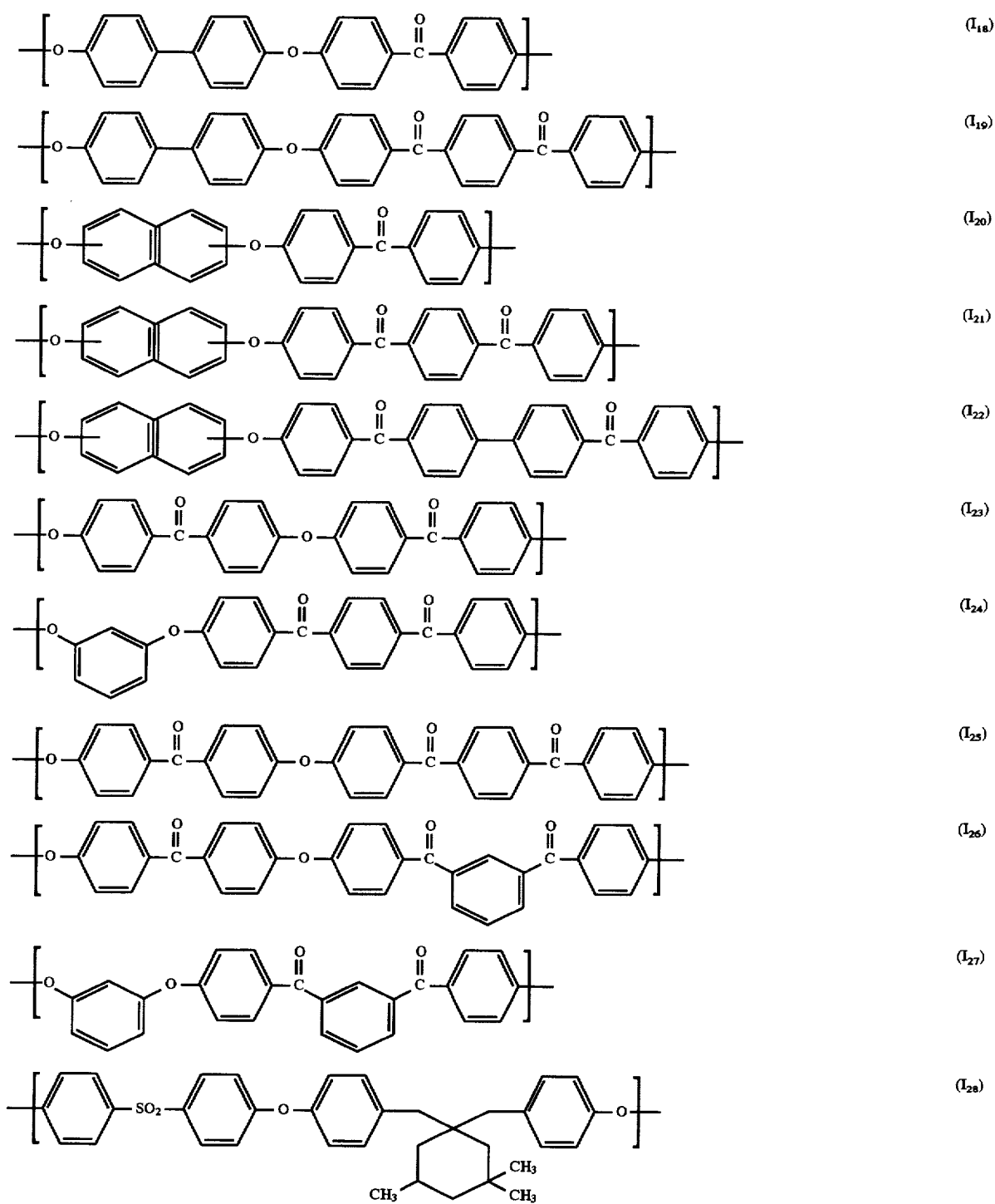

Very particularly preferred molding materials are those which contain, as component A, polyarylene ethers having repeating units ($I_1$), ($I_2$), ($I_{25}$) or ($I_{26}$). These include, for example, molding materials which contain, as component A, polyarylene ethers having from 0 to 100 mol % of repeating units ($I_1$) and from 0 to 100 mol % of repeating units ($I_2$).

The polyarylene ethers A may also be copolymers or block copolymers in which polyarylene ether segments and segments of other thermoplastic polymers, such as polyamides, polyesters, aromatic polycarbonates, polyestercarbonates, polysiloxanes, polyimides or polyetherimides, are present. The number average molecular weights $M_n$ of the blocks or of the grafts in the copolymers are, as a rule, from 1 000 to 30 000 g/mol. The blocks having different structure may be arranged alternately or randomly. The amount by weight of the polyarylene ethers in the copolymers or block copolymers is in general at least 10% by weight and may be up to 97% by weight. Preferred copolymers or block copolymers are those containing up to 90, particularly preferably from 20 to 80, % by weight of polyarylene ethers.

In general, the polyarylene ethers have number average molecular weights $\overline{M}_n$ of from 10 000 to 60 000 g/mol and relative viscosities of from 1.25 to 1.95. The relative viscosities are measured either in 1% strength by weight N-methylpyrrolidone solution, in mixtures of phenol and dichlorobenzene or as 0.5% strength by weight solutions in 96% strength sulfuric acid, depending on the solubility of the polyarylene ethers, in each case at 20° C. and 25° C.

Polyarylene ethers having repeating units I are known per se and can be prepared by known methods.

They are formed, for example, by condensation of aromatic bishalogen compounds and the alkali metal double salts of aromatic bisphenols. They can also be prepared, for example, by autocondensation of alkali metal salts of aromatic halophenols in the presence of a catalyst. DE-A-38 43 438 gives, for example, a detailed list of suitable monomers. Suitable processes are described, inter alia, in U.S. Pat. Nos. 3,441,538 and 4,108,837, DE-A1-27 38 962 and EP-A1-361. Polyarylene ethers which contain carbonyl functions are also obtainable by electrophilic (Friedel-Crafts) polycondensation, as described, inter alia, in WO 84/03892. In the case of the electrophilic polycondensation, either dicarbonyl chlorides or phosgene are reacted with aromatics which contain two hydrogen atoms displaceable by electrophilic substituents in order to form the carbonyl bridges, or an aromatic acyl chloride which contains both an acyl chloride group and a substitutable hydrogen atom is subjected to autopolycondensation.

Preferred process conditions for the synthesis of polyarylene ethers are described, for example, in EP-A-113 112 and 135 130. The reaction of the monomers in aprotic solvents, in particular N-methylpyrrolidone, in the presence of an anhydrous alkali metal carbonate, in particular potassium carbonate, is particularly suitable. Reacting the monomers in the melt has also proven advantageous in many cases.

Depending on the synthesis conditions, the polyarylene ethers may have different terminal groups. These include those which are inert toward the component B and those which are capable of reacting with functional groups of the copolymers B, in particular the amino and carboxyl groups.

The inert terminal groups include halogen, in particular chlorine, alkoxy, especially methoxy or ethoxy, and aryloxy, preferably phenoxy or benzyloxy. Examples of reactive groups are hydroxyl, anhydride, epoxy and carboxyl. The synthesis of such reactive polyarylene ethers is known to a person skilled in the art.

In an embodiment, the novel molding materials contain polyarylene ethers A which are essentially free of reactive terminal groups. However, it is also possible to use mixtures of different polyarylene ethers having inert and reactive terminal groups. The amount of the polyarylene ethers having reactive terminal groups may be from 2 to 98% by weight, based on the component A.

Component B

The novel molding materials contain, as component B, from 1 to 99, preferably from 5 to 95, % by weight of copolyamides. Particularly preferred novel molding materials contain from 10 to 90% by weight of copolyamide B.

According to the invention, these copolyamides B are essentially composed of $b_1$) from 30 to 44, preferably from 32 to 40, in particular from 32 to 38, mol % of units which are derived from terephthalic acid, $b_2$) from 6 to 20, preferably from 10 to 18, in particular from 12 to 18, mol % of units which are derived from isophthalic acid, $b_3$) from 43 to 49.5, preferably from 46 to 48.5, in particular from 46.3 to 48.2, mol % of units which are derived from hexamethylenediamine, $b_4$) from 0.5 to 7, preferably from 1.5 to 4, in particular from 1.8 to 3.7, mol % of units which are derived from aliphatic cyclic diamines of 6 to 30, preferably 13 to 29, in particular 13 to 17, carbon atoms and $b_5$) from 0 to 4 mol % of further polyamide-forming monomers which differ from $b_1$) to $b_4$), the molar percentages of components $b_1$) to $b_5$) together giving 100%.

The diamine units $b_3$) and $b_4$) are preferably reacted with the dicarboxylic acid units $b_1$) and $b_2$) in roughly equimolar amounts.

Suitable monomers $b_4$) are preferably cyclic diamines of the formula

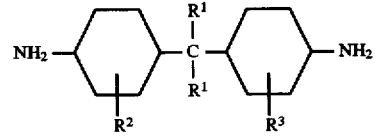

where $R^1$ is hydrogen or $C_1$–$C_4$-alkyl and $R^2$ and $R^3$ are each $C_1$–$C_4$-alkyl or hydrogen.

Particularly preferred diamines $b_4$) are bis(4-aminocyclohexyl)methane, bis(4-amino-3-methylcyclohexyl)methane, bis(4-aminocyclohexyl)-2,2-propane and bis(4-amino-3-methylcyclohexyl)-2,2-propane.

Examples of further monomers $b_4$) are 1,3- and 1,4-cyclohexanediamine and isophoronediamine.

In addition to the units $b_1$) to $b_4$) described above, the copolyamides B may contain up to 4, preferably up to 3.5, % by weight, based on the components $b_1$) to $b_4$), of further polyamide-forming monomers $b_5$).

Aromatic dicarboxylic acids as $b_5$) are of in general 8 to 16 carbon atoms. Examples of suitable aromatic dicarboxylic acids are substituted terephthalic and isophthalic acids, such as 3-tert-butylisophthalic acid, and polynuclear dicarboxylic acids, eg. 4,4'- and 3,3'-biphenyldicarboxylic acid, 4,4'- and 3,3'-diphenylmethanedicarboxylic acid, 4,4'- and 3,3'-dicarboxydiphenyl sulfone, 1,4- and 2,6-naphthalenedicarboxylic acid and phenoxyterephthalic acid.

Further polyamide-forming monomers $b_5$) may be derived, for example, from dicarboxylic acids of 4 to 16 carbon atoms and aliphatic diamines of 4 to 16 carbon atoms and from aminocarboxylic acids or corresponding lactams of 7 to 12 carbon atoms. Some suitable monomers of these types which may be mentioned here are suberic acid, azelaic acid or sebacic acid as typical aliphatic dicarboxylic acids, 1,4-butanediamine, 1,5-pentanediamine or piperazine as typical diamines, and caprolactam, capryllactam, enantholactam, laurolactam and ω-aminoundecanoic acid as typical lactams and aminocarboxylic acids, respectively.

The melting points of the copolyamides B are as a rule from 290° to 340° C., preferably from 292° to 330° C., this melting point being associated with a high glass transition temperature of, as a rule, more than 120° C., in particular more than 130° C. (in the dry state).

According to the invention, preferably used copolyamides B are those which have a crystallinity of >30%, preferably >35%, in particular >40%.

The crystallinity is a measure of the fraction of crystalline fragments in the copolyamide and is determined by X-ray diffraction or indirectly by measuring $\Delta H_{cryst}$.

Mixtures of the copolyamides B may of course also be used, any mixing ratio being possible.

Suitable processes for the preparation of the copolyamides are known to a person skilled in the art.

A preferred method of preparation is the batch process. In this process, the aqueous monomer solution is heated to 280°–340° C. in an autoclave in the course of from 0.5 to 3 hours, a pressure of 10–50, in particular 15–40, bar being reached, which is kept very constant for up to 2 hours by releasing excess steam. Thereafter, the autoclave is let down at constant temperature in the course of 0.5–2 hours, until a final pressure of from 1 to 5 bar is reached. The polymer melt is then discharged, cooled and granulated.

Another preferred process is carried out similarly to the processes described in EP-A 129 195 and 129 196.

In these processes, an aqueous solution of the monomers $b_1$) to $b_4$) and, if required, $b_5$), having a monomer content of from 30 to 70, preferably from 40 to 65, % by weight, is heated to 280°–330° C. in the course of less than 60 seconds under superatmospheric pressure (from 1 to 10 bar) and with simultaneous evaporation of water and formation of a prepolymer, after which prepolymers and steam are separated continuously, the steam is rectified and the entrained diamines are recycled. Finally, the prepolymer is passed into a polycondensation zone and subjected to polycondensation under a superatmospheric pressure of from 1 to 10 bar and at from 280° to 330° C. in a residence time of 5–30 minutes. Of course, the temperature in the reactor is above the melting point of the resulting prepolymer at the particular steam pressure.

As a result of these short residence times, the formation of triamines is substantially prevented.

The resulting polyamide prepolymer, which as a rule has a viscosity number of from 40 to 70, preferably from 40 to 60, ml/g, measured in a 0.5% strength by weight solution in 96% strength sulfuric acid at 25° C., is removed continuously from the condensation zone.

In a preferred procedure, the polyamide prepolymer thus obtained is passed in molten form through a discharge zone with simultaneous removal of the residual water contained in the melt. Suitable discharge zones are, for example, devolatilization extruders. The melt thus freed from water is then extruded and the extrudate is granulated.

These granules are subjected to continuous or batchwise solid-phase condensation under an inert gas at below the melting point, for example at from 170° to 240° C., until the desired viscosity is reached. For example, tumbling dryers may be used for the batchwise solid-phase condensation, and heating tubes through which hot inert gas flows may be used for the continuous solid-phase condensation. The continuous solid-phase condensation is preferred, the inert gas used being nitrogen or in particular super-heated steam, advantageously the steam obtained at the top of the column.

The viscosity number, measured in a 0.5% strength by weight solution in 96% strength sulfuric acid at 25° C. is in general from 100 to 500, preferably from 110 to 200, ml/g after the solid-phase postcondensation or after the other abovementioned preparation processes.

Component C

In addition to the components A and B, the novel molding materials may furthermore contain reinforcing agents or fillers. The novel molding materials may contain as component C, for example, up to 60, preferably from 0 to 45, particularly preferably from 10 to 40, % by weight of fibrous or particulate fillers or reinforcing agents or a mixture thereof.

Preferred fibrous fillers or reinforcing agents are carbon fibers, potassium titanate whiskers, aramid fibers and particularly preferably glass fibers. When glass fibers are used, they may be provided with a size and an adhesion promoter to improve the compatibility with the matrix material. In general, the carbon and glass fibers used have a diameter of from 6 to 20 μm.

The glass fibers may be incorporated both in the form of short glass fibers and in the form of rovings. In the finished injection molding, the average length of the glass fibers is preferably from 0.04 to 0.5 mm.

Carbon or glass fibers may also be used in the form of woven fabrics, mats or glass filament rovings.

Particularly suitable particulate fillers are amorphous silica, magnesium carbonate (chalk), powdered quartz, mica, talc, feldspar, glass beads and in particular calcium silicates, such as wollastonite and kaolin (in particular calcined kaolin).

Preferred combinations of fillers are, for example, from 5 to 30% by weight of wollastonite or talc with from 1 to 10% by weight of glass fibers.

Component D

The novel molding materials may furthermore contain, as component D, up to 40, preferably from 0 to 25, in particular from 3 to 20, % by weight of rubber impact modifiers D.

Preferred rubber impact modifiers D are polymers based on $d_1$) from 40 to 100% by weight of at least one α-olefin of 2 to 8 carbon atoms $d_2$) from 0 to 50% by weight of a diene, $d_3$) from 0 to 45% by weight of a $C_1$–$C_{12}$-alkyl ester of acrylic acid or methacrylic acid or a mixture of such esters, $d_4$) from 0 to 40% by weight of an ethylenically unsaturated mono- or dicarboxylic acid or a functional derivative of such an acid, $d_5$) from 0 to 40% by weight of an epoxy-containing monomer and $d_6$) from 0 to 5% by weight of other monomers capable of undergoing free radical polymerization, with the proviso that the component (D) is not an olefin homopolymer.

A first preferred group of rubber impact modifiers D comprises the ethylene/propylene (EPM) and ethylene/propylene/diene (EPDM) rubbers, which preferably have a ratio of ethylene to propylene units of from 40:60 to 90:10.

The Mooney viscosities (MLI+4/100° C.) of such, preferably uncrosslinked, EPM and EPDM rubbers (gel contents in general less than 1% by weight) are preferably from 25 to 100, in particular from 35 to 90 (measured using the large rotor after a running time of 4 minutes at 100° C., according to DIN 53 523).

EPM rubbers generally have virtually no double bonds, whereas EPDM rubbers may have from 1 to 20 double bonds per 100 carbon atoms.

Examples of diene monomers $d_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 2 to 20, particularly preferably from 3 to 15, % by weight, based on the total weight of the olefin polymer.

EPM and EPDM rubbers may preferably also be grafted with reactive carboxylic acids or derivatives thereof. Particular examples of these are acrylic acid, methacrylic acid and derivatives thereof, as well as maleic anhydride.

A further group of preferred rubber impact modifiers D comprises copolymers of α-olefins of 2 to 8 carbon atoms, in particular of ethylene, with $C_1$–$C_{18}$-alkyl esters of acrylic acid and/or methacrylic acid.

In principle, all primary and secondary $C_1$–$C_{18}$-alkyl esters of acrylic acid or methacrylic acid are suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of the methacrylates and acrylates $d_3$) in the rubber impact modifiers D is 0–60, preferably 10–50, in particular 30–45, % by weight.

Instead of the esters $d_3$), or in addition to these, acid-functional and/or latent acid-functional monomers based on ethylenically unsaturated mono- or dicarboxylic acids $d_4$) or epoxy-containing monomers $d_5$) may also be present in the rubber impact modifiers D.

Examples of monomers $d_4$) are acrylic acid, methacrylic acid, tertiary alkyl esters of these acids, in particular tert-butyl acrylate, and dicarboxylic acids, such as maleic acid and fumaric acid, or derivatives of these acids and monoesters thereof.

Latent acid-functional monomers are to be understood as meaning compounds which form free acid groups under the polymerization conditions or on incorporation of the component D in the molding materials. Examples of these are anhydrides of dicarboxylic acids of up to 20 carbon atoms, in particular maleic anhydride, and tertiary $C_1$–$C_{12}$-alkyl esters of the abovementioned acids, in particular tert-butyl acrylate and tert-butyl methacrylate.

The acid-functional or latent acid-functional monomers and the epoxy-containing monomers are preferably incorporated in the rubber impact modifiers D by adding to the monomer mixture compounds of the general formulae II-V

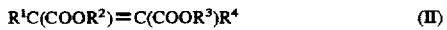 (II)

 (III)

 (IV)

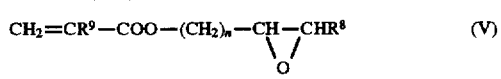 (V)

where $R^1$–$R^9$ are each hydrogen or alkyl of 1 to 6 carbon atoms, m is an integer from 0 to 20 and n is an integer from 0 to 10.

$R^1$–$R^7$ are each preferably hydrogen, m is preferably 0 or 1 and n is preferably 1. The corresponding compounds are maleic acid, fumaric acid and maleic anhydride $d_4$) or alkenyl glycidyl ethers or vinyl glycidyl ether $d_5$).

Preferred compounds of the formulae II, III, IV and V are maleic acid and maleic anhydride as component $d_4$) and epoxy-containing esters of acrylic acid and/or methacrylic acid, glycidyl acrylate and glycidyl methacrylate (as component $d_5$) being particularly preferred.

The amount of components $d_4$) and $d_5$) is in each case from 0.07 to 40, in particular from 0.1 to 20, particularly preferably from 0.15 to 15, % by weight, based on the total weight of the rubber impact modifiers D.

Particularly preferred rubber impact modifiers D are those composed of from 50 to 98.9, in particular from 60 to 95, % by weight of ethylene, from 0.1 to 20, in particular from 0.15 to 15, % by weight of glycidyl acrylate and/or glycidyl methacrylate, acrylic acid and/or maleic anhydride and from 1 to 45, in particular from 10 to 35, % by weight of n-butyl acrylate and/or 2-ethylhexyl acrylate.

Further preferred esters of acrylic and/or methacrylic acid are the methyl, ethyl, propyl and isobutyl esters.

Examples of suitable other monomers $d_6$) are vinyl esters and vinyl ethers.

The ethylene copolymers described above can be prepared by processes known per se, preferably by random copolymerization under high pressure and at elevated temperatures.

The melt flow index of the ethylene copolymers is in general from 1 to 80 g/10 min (measured at 190° C. and 2.16 kg load).

A further group of suitable rubber impact modifiers D comprises core/shell graft rubbers. These are graft rubbers which are prepared in emulsion and consist of at least one hard and one soft component. A hard component is usually understood as meaning a polymer having a glass transition temperature of at least 25° C., while a soft component is understood as meaning a polymer having a glass transition temperature of not more than 0° C. These products have a structure comprising a core and at least one shell, the structure being determined by the order of addition of the monomers. The soft components are derived in general from butadiene, isoprene, alkyl acrylates, alkyl methacrylates or siloxanes and, if required, further comonomers. Suitable siloxane cores can be prepared, for example, starting from cyclic oligomeric octamethyltetrasiloxane or tetravinyltetramethyltetrasiloxane. These may be reacted, for example, with γ-mercaptopropylmethyldimethoxysilane in a ring-opening cationic polymerization, preferably in the presence of sulfonic acids, to give the soft siloxane cores. The siloxanes may also be crosslinked by, for example, carrying out the polymerization reaction in the presence of silanes having hydrolyzable groups, such as halogen or alkoxy, eg. tetraethoxysilane, methyltrimethoxysilane or phenyltrimethoxysilane. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The hard components are derived in general from styrene, α-methylstyrene and copolymers thereof, examples of preferred comonomers here being acrylonitrile, methacrylonitrile and methyl methacrylate.

Preferred core/shell graft rubbers contain a soft core and a hard shell or a hard core, a first soft shell and at least one further hard shell. The incorporation of functional groups, such as carbonyl, carboxyl, anhydride, amido, imido, carboxylic ester, amino, hydroxyl, epoxy, oxazoline, urethane, urea, lactam or halobenzyl, is preferably effected by the addition of suitable functionalized monomers during the polymerization of the final shell. Suitable functionalized monomers are, for example, maleic acid, maleic anhydride, mono- or diesters of maleic acid, tert-butyl (meth)acrylate, acrylic acid, glycidyl (meth)acrylate and vinyloxazoline. The amount of monomers having functional groups is in general from 0.1 to 25, preferably from 0.25 to 15, % by weight, based on the total weight of the core/shell graft rubber. The weight ratio of soft to hard components is in general from 1:9 to 9:1, preferably from 3:7 to 8:2.

Such rubbers are known per se and are described, for example, in EP-A 208 187.

A further group of suitable impact modifiers comprises thermoplastic polyester elastomers. Polyester elastomers are understood as meaning segmented copolyether esters which contain long-chain segments, which are derived as a rule from poly(alkylene) ether glycols, and short-chain segments which are derived from low molecular weight diols and dicarboxylic acids. Such products are known per se and are described in the literature, for example in U.S. Pat. No. 3,651,014. Corresponding products are also commercially available under the names Hytrel® (Du Pont), Arnitel® (Akzo) and Pelprene® (Toyobo Co. Ltd.).

Mixtures of different rubbers may of course also be used.

Component E

The novel molding materials may contain, as component E, additives and processing assistants or a mixture thereof.

The amount of these is in general up to 40, preferably from 0 to 15, % by weight, based on the total weight of the components (A) to (E).

Conventional additives are, for example, stabilizers and antioxidants, heat stabilizers and UV stabilizers, lubricants and mold release agents, dyes and pigments and plasticizers.

Pigments and dyes are generally present in amounts of up to 6, preferably from 0.5 to 5, in particular from 0.5 to 3, % by weight.

The pigments for coloring thermoplastics are generally known, cf. for example R. Gächter and H. Muller, Taschenbuch der Kunststoff-additive, Carl Hanser Verlag, 1983, pages 494 to 510. A first preferred group of pigments comprises white pigments, such as zinc oxide, zinc sulfide, lead white ($2 PbCO_3.Pb(OH)_2$), lithopone, antimony white and titanium dioxide. Of the two most commonly used crystalline modifications (rutile and anatase) of titanium dioxide, the rutile form is used in particular for imparting a white color to the novel molding materials.

Black pigments which may be used according to the invention are iron oxide black ($Fe_3O_4$), spinel black ($Cu(Cr,Fe)_2O_4$), manganese black (mixture of manganese dioxide, silica and iron oxide), cobalt black and antimony black and particularly preferably carbon black, which is generally used in the form of furnace black or gas black (in this context, cf. G. Benzing, Pigmente für Anstrichmittel, Expert-Verlag (1988), page 78 et seq.).

For obtaining certain hues, it is of course also possible according to the invention to use inorganic colored pigments, such as chrome oxide green, or organic colored pigments, such as azo pigments and phthalocyanines. Such pigments are in general commercially available.

Antioxidants and heat stabilizers which may be added to the thermoplastic materials according to the invention are, for example, halides of metals of group I of the Periodic Table, for example sodium halides, potassium halides and lithium halides, if necessary in combination with copper(I) halides, for example chlorides, bromides or iodides. The halides, and in particular those of copper, may also contain electron-rich π ligands. Examples of such copper complexes are copper halide complexes with, for example, triphenylphosphine. Zinc fluoride and zinc chloride may also be used. Sterically hindered phenols, hydroquinones, substituted members of this group, secondary aromatic amines, if necessary in combination with phosphorus-containing acids or salts thereof, and mixtures of these compounds may also be used, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Lubricants and mold release agents, which as a rule are added to the thermoplastic material in amounts of up to 1% by weight, are stearic acid, stearyl alcohol, alkyl stearates and stearamides, as well as esters of pentaerythritol with long-chain fatty acids. Salts of calcium, of zinc or of aluminum with stearic acid and dialkyl ketones, eg. distearyl ketone, may also be used.

The additives include stabilizers which prevent the decomposition of the red phosphorus in the presence of moisture and atmospheric oxygen. Examples are compounds of cadmium, of zinc, of aluminum, of tin, of magnesium, of manganese and of titanium. Particularly suitable compounds are, for example, oxides of the stated metals, and carbonates or basic carbonates, hydroxides and salts of organic or inorganic acids, such as acetates or phosphates or hydrogen phosphates.

The novel thermoplastic molding materials can be prepared by processes known per se, by mixing the starting components in a conventional mixing apparatus, such as an extruder, a Brabender mill or a Banbury mill, and then extruding the mixture. After extrusion, the extrudate is cooled and comminuted.

The novel molding materials have high heat distortion resistance, good flow, high rigidity at above 100° C. and improved processing stability. They are suitable for the production of moldings, films or fibers, particularly for the electrical or electronics sector, as well as in the area of automotive or apparatus construction.

EXAMPLES

Component $A_1$

A polyarylene ether containing repeating units of the formula

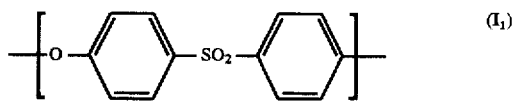

characterized by a viscosity number of 56 ml/g (measured in 1% strength by weight solution in a mixture of phenol and 1,2-dichlorobenzene in a ratio of 1:1), ie. Ultrason® E 2010 from BASF, was used as component $A_1$.

Preparation of Components B

Component $B_1$ and $B_3$ (According to the Invention)

A 60% strength aqueous solution consisting of terephthalic acid, isophthalic acid, hexamethylenediamine or bis(4-amino-3-methylcyclohexyl)methane or bis(4-aminocyclohexyl)methane was conveyed, in the ratios stated in the table, from a heated storage container at about 80° C., at a rate corresponding to an amount of polyamide of 5 kg/hour, by means of a metering pump, into a tubular evaporator arranged partly horizontally and partly vertically. The evaporator was heated by means of a liquid heating medium which was at 326° C., with vigorous circulation. The evaporator had a length of 3 m, a capacity of 180 ml and a heat-transfer surface area of about 1300 cm². The residence time in the evaporator was 50 seconds. The mixture of prepolymer and steam leaving the evaporator was at 310° C.

and was separated in a separator into steam and melt. The melt remained in the separator for a further 10 minutes and was then extruded by means of an extruder having a devolatilization zone, solidified in a water bath and then granulated. The separator and the evaporator zone were kept at 5 bar by a pressure-regulating means which was arranged downstream of the column. The steam separated off in the separator was fed into a packed column which had about 10 theoretical plates and into which about 1 l of vapor condensate per hour was introduced at the top to generate a reflux. The resulting temperature at the top of the column was 152° C. The steam emerging after the relief valve was condensed and contained less than 0.05% by weight of hexamethylenediamine. An aqueous solution which contained 80% by weight, based on polyamide produced, of hexamethylenediamine was obtained at the bottom of the column. This solution was recycled to the starting salt solution before the entrance into the evaporator by means of a pump.

After the polymer melt had emerged from the separator, the polyamide had a very pale natural color and a viscosity number of 48 ml/g (measured as a 0.5% strength by weight solution in 96% strength by weight $H_2SO_4$ at 25° C. according to DIN 53 246).

The product had roughly equivalent amounts of carboxyl and amino terminal groups.

In the extruder, the melt was then let down to atmospheric pressure and underwent virtually no further condensation during a residence time of less than 1 minute.

The products were then heated batchwise in the solid phase in a stationary heating tube (double-walled glass tube which was heated externally with oil to the required temperature and had an internal diameter of 120 mm and a length of 1000 mm and through which the preheated steam flowed at a rate of 120 l/min) at 200° C. until a viscosity number of 112 ml/g was reached. The residence time was from 8 to 18 hours. In the course of this heating, a large part of the extractable residual monomers was, if required, also extracted from the steam.

Component $B_2$ (According to the Invention)

2 kg of a monomer mixture corresponding to Example 1 were initially taken with 700 ml of water in a 5 l laboratory autoclave. The mixture was distributed over 5 glass tubes, each having a capacity of 800 ml. The autoclave was heated at 350° C. for 1 hour, the resulting steam pressure being kept constant after reaching 20 bar by releasing excess water. The temperature and pressure were then kept constant for a further hour. Thereafter, the autoclave was cooled to 330° C. and let down to atmospheric pressure. The heating of the autoclave was switched off, room temperature being reached after about 3 hours.

The glass tubes were removed from the autoclave and their content was coarsely milled. The product obtained was subjected to solid-phase postcondensation at 198° C. under nitrogen for 10 hours until a viscosity number of 115 ml/g was reached.

Components $B_{1v}$ to $B_{3v}$ (For Comparison)

3 kg of a monomer mixture which gave the polymers shown in the table were initially taken with 2,500 ml of water in a 10 l laboratory autoclave. The preparation and working up were carried out according to Example 2. After the solid-phase postcondensation under nitrogen at 196° C. (10 hours), the copolyamides had a viscosity number of 114 ml/g.

Component $B_{4v}$ (For Comparison)

Partly aromatic copolyamide obtained by reacting the following monomers 34.09 mol % of terephthalic acid
34.09 mol % of hexamethylenediamine
31.82 mol % of ε-caprolactam, characterized by a relative viscosity of 2.4 (measured in 1% strength by weight solution in 96% strength by weight sulfuric acid at 25° C.).

The compositions and properties of components B are shown in Table 1. The specific heat of fusion $\Delta H_{cryst.}$ was determined as a measure of the crystallinity by means of differential scanning calorimetry using a DSC 9900 from Du Pont at a heating rate of 20° C./min.

TABLE 1

| | | According to the invention | | | For comparison | | | |
|---|---|---|---|---|---|---|---|---|
| Monomers | Amount in: | $B_1$ | $B_2$ | $B_3$ | $B_{1v}$ | $B_{2v}$ | $B_{3v}$ | $B_{4v}$ |
| Terephthalic acid | mol % | 32.2 | 32.2 | 40.3 | 29.5 | 32.2 | 32.2 | 34.09 |
| | % by wt. | 37.5 | 37.5 | 42.2 | 34.0 | 37.8 | 35.9 | |
| Isophthalic acid | mol % | 17.8 | 17.8 | 18.6 | 29.5 | 17.8 | 17.8 | — |
| | % by wt. | 20.6 | 20.6 | 18.6 | 23.6 | 20.9 | 20.9 | — |
| Hexamethylenediamine | mol % | 48.1 | 48.1 | 48.0 | 46.2 | 49.7 | 42.7 | 34.09 |
| | % by wt. | 39.1 | 39.1 | 35.0 | 36.9 | 40.8 | 33.3 | |
| $H_2N$—⟨ ⟩—$CH_2$—⟨ ⟩—$NH_2$ | mol % | 1.9 | 1.9 | — | 3.8 | 0.3 | 7.3 | — |
| | % by wt. | 2.8 | 2.8 | — | 5.5 | 0.45 | 10.9 | — |
| $H_2N$—⟨$CH_3$⟩—$CH_2$—⟨$CH_3$⟩—$NH_2$ | mol % | — | — | 2 | — | — | — | — |
| | % by wt. | — | — | 3 | — | — | — | — |

TABLE 1-continued

| | | Composition and properties of the copolyamides | | | | | | |
|---|---|---|---|---|---|---|---|---|
| | Amount | According to the invention | | | For comparison | | | |
| Monomers | in: | $B_1$ | $B_2$ | $B_3$ | $B_{1v}$ | $B_{2v}$ | $B_{3v}$ | $B_{4v}$ |
| ε-Caprolactam | mol % | — | — | — | — | — | — | 31.82 |
| Properties: $\Delta H_{cryst.}$ [J/g] | | 54 | 52 | 51 | 32 | 36 | 31 | |

Component C

Glass rovings having a thickness of 10 μm were used.

Component D

An ethylene/propylene rubber which was grafted with 0.7% by weight of maleic acid and/or maleic anhydride was used; it had a melt flow index of 3 g/10 min (measured at 230° C. and under a load of 2.16 kg).

The components were mixed in a twin-screw extruder at a melt temperature of from 320° to 380° C. The melt was passed through a water bath and then granulated.

The dried granules were processed at from 320° to 360° C. to give standard small bars and dumbbells.

The heat distortion resistance of the samples was evaluated by means of the Vicat softening temperatures. The Vicat softening temperatures were determined according to DIN 53 460 at a force of 49.05N with a temperature increase of 50K per hour using standard small bars.

The flow of the molding materials was determined from the melt volume index (MVI) according to DIN 53 735 at 320° C. and under a load of 21.6 kg.

The absolute magnitude of the difference between the MVI values, measured after standing for 5 and 15 minutes at 340° C., based on the MVI value measured after 5 minutes, was chosen as a measure of the processing stability.

The stated modulus of elasticity and tensile strength indicate the rigidity and strength of the molding materials, determined by tensile tests according to DIN 53 455 on dumbbells at 110° C.

The composition of the molding materials and the results of the application tests are shown in Tables 2 and 3.

TABLE 2

| | Glass fiber-reinforced molding materials | | | | | | | | |
|---|---|---|---|---|---|---|---|---|---|
| | According to the invention | | | | For comparison | | | | |
| Molding material.: | 1 | 2 | 3 | 4 | V1 | V2 | V3 | V4 | V5 |
| | Composition [% by weight] | | | | | | | | |
| Component | | | | | | | | | |
| A | 42 | 49 | 49 | 49 | 49 | 49 | 49 | 49 | 70 |
| $B_1$ | 28 | 21 | | | | | | | |
| $B_2$ | | | 21 | | | | | | |
| $B_3$ | | | | 21 | | | | | |
| $B_{1v}$ | | | | | 21 | | | | |
| $B_{2v}$ | | | | | | 21 | | | |
| $B_{3v}$ | | | | | | | 21 | | |
| $B_{4v}$ | | | | | | | | 21 | |
| C | 30 | 30 | 30 | 30 | 30 | 30 | 30 | 30 | 30 |
| Properties | | | | | | | | | |
| Vicat B [°C.] | 206 | 207 | 207 | 208 | 206 | 205 | 205 | 205 | 219 |
| MVI[1] [ml/10'] | 138 | 132 | 129 | 126 | 118 | 137 | 132 | 142 | 27 |
| Modulus of elasticity at 110° C. [N/mm] | 9400 | 9300 | 9200 | 9250 | 8650 | 8850 | 8700 | 7400 | 8600 |
| Δ MVI[2] [%] | 5 | 4 | 3 | 4 | 9 | 8 | 7 | 25 | 0 |

[1] measured at 320° C. and under a load of 21.6 kg
[2] Δ MVI = $(MVI_5 - MVI_{15}/MVI_5) \times 100$; measurement at 340° C., 10 kg

TABLE 3

| | Toughened molding materials | | | | | | |
|---|---|---|---|---|---|---|---|
| | According to the invention | | | | For Comparison | | |
| Molding material No.: | 5 | 6 | 7 | 8 | V6 | V7 | V8 |
| Component | Composition [% by weight] | | | | | | |
| A | 90 | 80 | 70 | 60 | 70 | 70 | 100 |
| $B_1$ | 8.5 | 17 | 25.5 | 34 | | | |
| $B_{3v}$ | | | | | 25.5 | | |
| $B_{4v}$ | | | | | | 25.5 | |
| D | 1.5 | 3 | 4.5 | 6 | 4.5 | 4.5 | |
| Vicat B [°C.] | 211 | 208 | 206 | 204 | 205 | 204 | 217 |
| MVI[1] [ml/10'] | 86 | 116 | 153 | 186 | 152 | 160 | 46 |
| Modulus of elasticity at | 2400 | 2350 | 2250 | 2180 | 2150 | 1700 | 2500 |

TABLE 3-continued

Toughened molding materials

| Molding | According to the invention | | | | For Comparison | | |
|---|---|---|---|---|---|---|---|
| material No.: | 5 | 6 | 7 | 8 | V6 | V7 | V8 |
| Component | Composition [% by weight] | | | | | | |
| 110° C. [N/mm] Δ MVI[2] [%] | 2 | 3 | 3 | 4 | 7 | 29 | 0 |

[1] measured at 320° C. and under a load of 21.6 kg
[2] Δ MVI = (MVI$_5$, − MVI$_{15}$/MVI$_5$,) × 100; measurement at 340° C. and 21.6 kg

We claim:

1. A molding material containing

A) from 1 to 99% by weight of polyarylene ethers having repeating units (I)

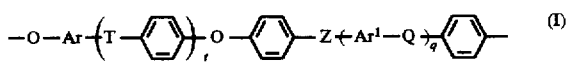  (I)

where t and q may each be an integer 0, 1, 2 or 3, T, Q and Z may each be a chemical bond or —O—, —S—, —SO$_2$—, S=O, C=O, —N=N—, R$^a$C=CR$^b$— or —CR$^c$R$^d$—, with the proviso that at least one of the groups T, Q and Z is —SO$_2$— or C=O, R$^a$ and R$^b$ are each hydrogen or C$_1$–C$_{10}$-alkyl, R$^c$ and R$^d$ are each hydrogen, C$_1$–C$_{10}$-alkyl, C$_5$–C$_{10}$-cycloalkyl, C$_1$–C$_{10}$-alkoxy or C$_6$–C$_{18}$-aryl, where the abovementioned groups may each be substituted by fluorine and/or chlorine, Ar and Ar$^1$ are each C$_6$–C$_{18}$-aryl, which may have substituents selected from the group consisting of C$_1$–C$_{10}$-alkyl, C$_6$–C$_{18}$-aryl, C$_1$–C$_{10}$-alkoxy and halogen, or repeating units

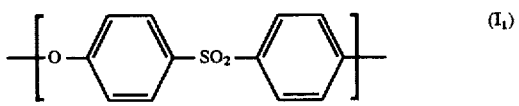  (I$_1$)

B) from 1 to 99% by weight of copolyamides consisting essentially of b$_1$) from 30 to 44 mol % of units which are derived from terephthalic acid,
b$_2$) from 6 to 20 mol % of units which are derived from isophthalic acid,
b$_3$) from 43 to 49.5 mol % of units which are derived from hexamethylenediamine,
b$_4$) from 0.5 to 7 mol % of units which are derived from aliphatic cyclic diamines of 6 to 30 carbon atoms and
b$_5$) from 0 to 4 mol % of further polyamides-forming monomers which differ from b$_1$) to b$_4$), the molar percentages of components b$_1$) to b$_5$) together giving 100%, and C) from 0 to 60% by weight of fibrous or particulate fillers or reinforcing agents,
D) from 0 to 40% by weight of rubber impact modifiers and
E) from 0 to 40% by weight stabilizers, antioxidants, lubricants, mold release agents, dyes, pigments, plasticizers or mixtures thereof the percentages by weight of components A) to E) together giving 100%.

2. A molding material as defined in claim 1, containing
A) from 10 to 90% by weight of polyarylene ethers A and
B) from 10 to 90% by weight of copolyamides B.

3. A molding material as defined in claim 1, wherein the polyarylene ethers A contain a$_1$) repeating units I$_1$

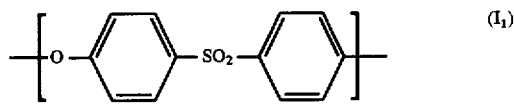  (I$_1$)

and a$_2$) units I$_2$

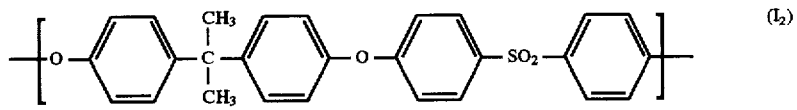  (I$_2$)

4. A molding material as defined in claim 1, wherein the copolyamides B are essentially composed of b$_1$) from 32 to 40 mol % of units which are derived from terephthalic acid,
b$_2$) from 10 to 18 mol % of units which are derived from isophthalic acid,
b$_3$) from 46 to 48.5 mol % of units which are derived from hexamethylenediamine and
b$_4$) from 1.5 to 4 mol % of units which are derived from aliphatic cyclic diamines of 6 to 30 carbon atoms.

5. A molding material as defined in claim 1, wherein the copolyamides B contain, as component b$_4$, bis(4-aminocyclohexyl)methane or bis(4-amino-3-methylcyclohexyl)methane or a mixture thereof.

6. A molding, fiber or film composed of a molding material as defined in claim 1.

7. A molding material as defined in claim 1, wherein the polyarylene ethers A) have repeating units of the formula I.

8. A molding material as defined in claim 1, wherein the polyarylene ethers A) contain repeating units (I$_1$)

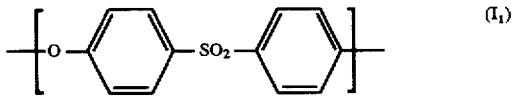  (I$_1$)

9. A molding material as defined in claim 1, wherein the polyarylene ethers A) contain repeating units (I$_2$)

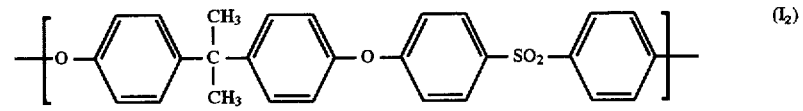  (I$_2$)

* * * * *

UNITED STATES PATENT AND TRADEMARK OFFICE
CERTIFICATE OF CORRECTION

PATENT NO.: 5,639,833

DATED: June 17, 1997

INVENTOR(S): WEBER et al.

It is certified that error appears in the above-identified patent and that said Letters Patent is hereby corrected as shown below:

Column 19, claim 1, line 46, below the formula ($I_1$), insert:
 --or mixtures of (I) and ($I_1$)--.

Column 20, claim 3, line 22, "$a_2$) units $I_2$" should be --$a_2$) repeating units $I_2$--.

Signed and Sealed this

Fifth Day of August, 1997

Attest:

BRUCE LEHMAN

*Attesting Officer*     Commissioner of Patents and Trademarks